United States Patent [19]

Saikai

[11] Patent Number: 4,465,245

[45] Date of Patent: Aug. 14, 1984

[54] AUTOMATIC LOCKING TYPE TAKE-UP DEVICE

[75] Inventor: Toshihiro Saikai, Fujisawa, Japan

[73] Assignee: NSK Warner K.K., Tokyo, Japan

[21] Appl. No.: 474,034

[22] Filed: Mar. 10, 1983

[30] Foreign Application Priority Data

Mar. 19, 1982 [JP] Japan .............................. 57-38097[U]

[51] Int. Cl.³ ........................ A62B 35/00; B65H 75/48
[52] U.S. Cl. ............................................. 242/107.4 D
[58] Field of Search ................ 242/107.4 D, 107.4 E,
242/107.4 R; 280/807, 808; 297/476

[56] References Cited

U.S. PATENT DOCUMENTS

| | | | |
|---|---|---|---|
| 3,558,075 | 1/1971 | Stoffel | 242/107.4 D |
| 3,598,336 | 8/1971 | Frost | 242/107.4 D |
| 3,635,419 | 1/1972 | Pringle | 242/107.4 E |
| 3,744,732 | 7/1973 | Fowler | 242/107 |
| 3,767,135 | 10/1973 | Booth | 242/107.4 D |
| 4,034,931 | 7/1977 | Fisher et al. | 242/107.4 D |

*Primary Examiner*—John M. Jillions
*Attorney, Agent, or Firm*—Shapiro and Shapiro

[57] ABSTRACT

An automatic locking type take-up device comprises a base member, a webbing take-up reel rotatably supported by the base member and biased in a direction to take up webbing, an engaging member integrally mounted on the take-up reel, a webbing winding-amount sensing member rotatable in response to rotation of the take-up reel, a lock member movably supported by the base member and capable of assuming a locking position and a non-locking position, a biasing member for biasing the lock member toward the locking position, a first movable member engaged with the winding-amount sensing member, and a second movable member operatively engaged with the first movable member. When the webbing is drawn out from a webbing rolled-up condition and later a small amount of webbing is rolled up, the lock member is first engaged with the first movable member, then engaged with the second movable member and finally disengaged from the two movable members to be brought to the locking position from the non locking position, so that the rotation of the take-up reel in the webbing draw-out direction is locked.

5 Claims, 6 Drawing Figures

AUTOMATIC LOCKING TYPE TAKE-UP DEVICE

BACKGROUND OF THE INVENTION

1. Field of the Invention

This invention relates to an automatic locking type take-up device for automatically locking the rotation of a take-up reel in the webbing draw-out direction when the webbing is drawn out from the take-up reel and worn by an operator.

2. Description of the Prior Art

There is known an automatic locking type take-up device having a sensing member for controlling a lock member, which directly contacts webbing and senses the radius of the wound layer thereof generally corresponding to the winding-amount of the webbing on a take-up reel, thereby locking the rotation of the reel in the webbing draw-out direction when the webbing is drawn out from the take-up reel, or an automatic locking type take-up device having a sensing member for sensing the number of revolutions of the take-up reel and causing a lock member that locks the rotation of the take-up reel in the webbing draw-out direction at the time of draw-out of the webbing to move continuously from a non-locking position to a locking position.

However, in the former device, depending on the wound up condition of the webbing on the take-up reel, the webbing may engage the sensing member when it must not engage the sensing member, whereby the lock member may assume a half-locking position in which control of the lock member is unstable or unreliable, and when the webbing is twisted, it may catch the sensing member to cause unsatisfactory draw-out of the webbing. In the latter device, the boundary between the locking position and the non-locking position may become unclear and this may lead to unreliable operation of the lock member.

SUMMARY OF THE INVENTION

It is an object of the present invention to solve the above-noted problem peculiar to the prior art and to provide an automatic locking type take-up device in which control of the lock member is effected stably and reliably and the boundary between the locking position and the non-locking position is clear, eliminating trouble such as unsatisfactory draw-out of the webbing.

The invention will become fully apparent from the following detailed description of an embodiment thereof taken in conjunction with the accompanying drawings.

DESCRIPTION OF THE PREFERRED EMBODIMENT

Figure 1:
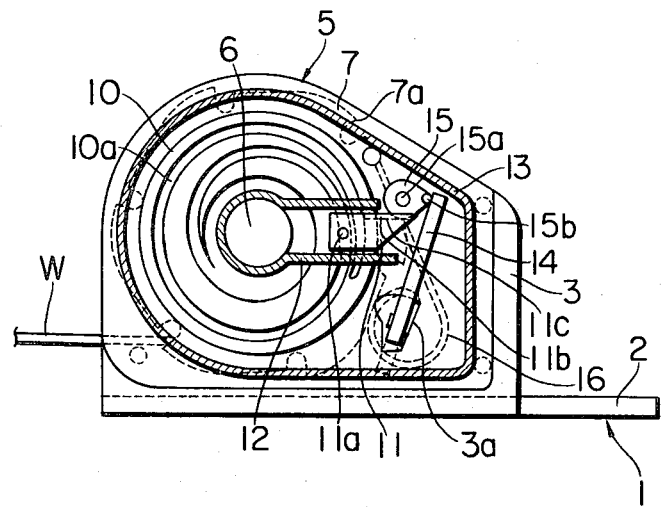
FIG. 1 is a front view, partly in cross-section, of an embodiment of the present invention.
Figure 2:
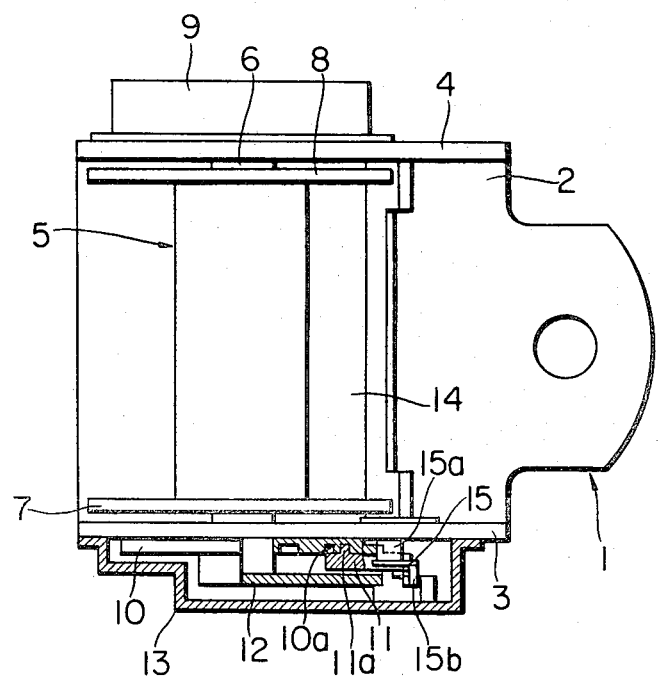
FIG. 2 is a plan view, partly in cross-section, of the embodiment shown in FIG. 1.
Figure 3A:
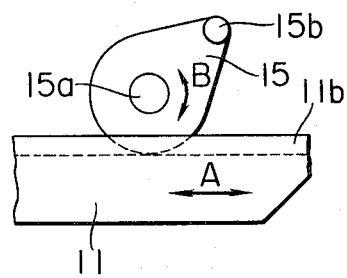
FIG. 3A and 3B are enlarged views showing the relation between an arm member and a cam member.
Figure 3B:
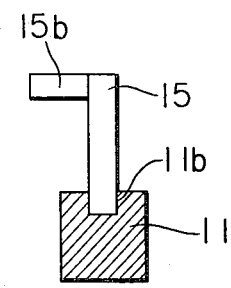

In FIGS. 1 and 2, a base member 1 has a bottom surface portion 2 and a pair of side plate portions 3 and 4 rising from the opposite lateral edges thereof and opposed to each other. A webbing take-up reel 5 is rotatably mounted between the pair of side plate portions 3 and 4. The take-up reel 5 has a take-up spindle 6 and a pair of ratchet wheels 7 and 8 secured to the spindle adjacent to the opposite ends thereof. Webbing W is adapted to be taken up between the pair of ratchet wheels 7 and 8. The take-up reel 5 is biased in a counter-clockwise direction (in FIG. 1) which is the webbing take-up direction, by a take-up spring, not shown, which is located in a spring case 9 mounted on the side plate portion 4, and the ratchet wheels 7 and 8 have an engagement surfaces 7a which face in a direction that permits unimpeded rotation of the reel 5 in the webbing take-up direction. A webbing winding-amount sensing member 10 is secured to the end of the take-up spindle 6 projecting through the side plate portion 3 and is formed with a spiral groove 10a extending in clockwise (in FIG. 1) and outward direction from the radially inner part. A protrusion 11a of an arm member 11 fits in the groove 10a, and the arm member 11 is adapted to move to left and right along a guide member 12 in response to rotation of the sensing member 10. The guide member 12 is attached to a cover member 13 secured to the side plate portion 3, but alternatively it may be directly attached to the side plate portion 3. The arm member 11, as shown in the enlarged views of FIGS. 3A and 3B, further has therein a groove 11b and a protrusion 11c (FIG. 4) engaging a lock member 14 which will be described later. The marginal portion of a cam member 15 fits in the groove 11b in the arm member 11 and these two are in frictional contact with each other. The cam member 15 is adapted to rotate in the direction of arrow B about a shaft 15a as the arm member 11 moves in the direction of arrow A indicated in FIG. 3A. The shaft 15a is mounted on the side plate portion 3. Further, the cam member 15 has a protrusion 15b for engaging the lock member 14. Describing the operative association between the arm member 11 and the cam member 15 in detail (with reference to FIGS. 1, 4, and 5), the arm member 11 moves to left from its position in which it is engaged with the lock member 14 and thus comes out of engagement with the latter and substantially simultaneously therewith, the cam member 15 rotates clockwise into engagement with the lock member 14. Thus, even if the arm member 11 moves further to the left afterwards, the cam member 15 remains in the same position to keep the lock member 14 in the position disengaged from the ratchet wheels 7 and 8. Thereafter, when the arm member 11 slightly moves to the right, the cam member 15 rotates counter-clockwise and thus comes out of engagement with the lock member 14, and both of these members 11 and 15 move off the lock member 14, which thus becomes engageable with the engagement surfaces 7a of the ratchet wheels 7 and 8. In such manner, the arm member 11 and the cam member 15 are in an operatively associated relation through the frictional contact between the groove 11b and the marginal portion of the cam member, and when a rotation preventing force is applied to the cam member 15, even if the arm member 11 moves, the marginal portion of the cam member 15 only slides in the groove 11b and the cam member 15 does not rotate.

The lock member 14 is movable supported in sector holes 3a formed in the side plate portions 3 and 4 and is biased by a spring member 16 in a direction to engage the engagement surfaces 7a of the ratchet wheels 7 and 8.

The operation of the present embodiment having the above-described constructions will now be described by reference to FIGS. 1, 4 and 5.

Figure 4:
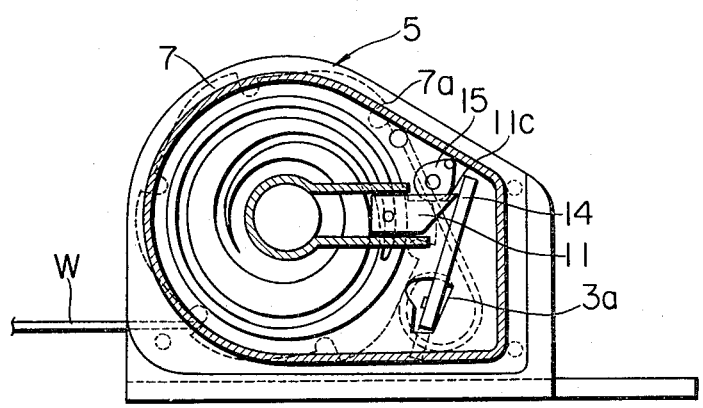
FIGS. 4 and 5 illustrate the operation of the device of the present invention.
Figure 5:
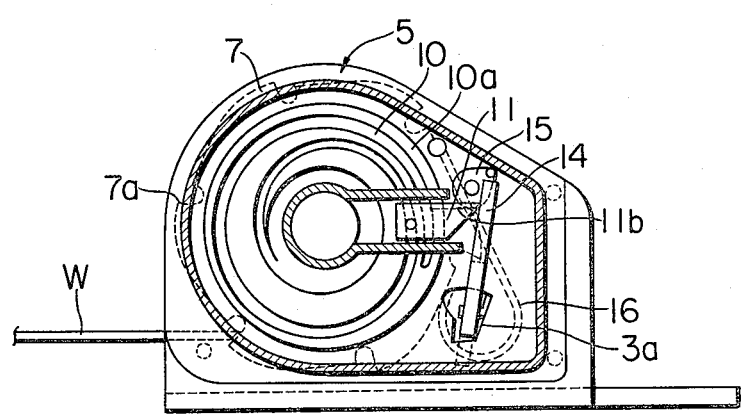

With the entire amount of webbing W wound on the reel 5, the arm member 11 is in its rightmost displaced position and the protrusion 11c thereof is in engagement with the lock member 14 and holds the same in a non-locking position wherein it is unengageable with the engagement surfaces 7a of the ratchet wheels 7 and 8, as shown in FIG. 4. At this time, the cam member 15 is in a position wherein it has been turned leftwardly by the rightward movement of the arm member 11 during the preceding step, and thus is out of engagement with the lock member 14. Accordingly, the take-up reel 5 is rotatable in the draw-out direction.

As the webbing W is drawn out from the condition of FIG. 4, the sensing member 10 rotates clockwise with the take-up reel 5 and the protrusion 11a traces the groove 10a in the sensing member, whereby the arm member 11 moves to left and separates from the lock member 14, as shown in FIG. 1. However, substantially simultaneously therewith, the cam member 15 turns clockwise and comes into engagement with the lock member 14 at the protrusion 15b and thus, the lock member 14 continues to be held in its non-locking position. In this manner, a condition in which the webbing W can be drawn out continues.

When a suitable amount of webbing W is drawn out and then a small amount of webbing is rolled up for the operator to wear the webbing W, the sensing member 10 again turns counter-clockwise with the take-up reel 5 to move the arm member 11 slightly in the rightwardly direction. Thereupon, as shown in FIG. 5, the contact between the groove 11b and the marginal portion causes the cam member 15 to turn counter-clockwise and come out of engagement with the lock member 14, whereby the lock member 14 is brought by the spring member 16 into a position in which it is engageable with the engagement surfaces 7a of the ratchet wheels 7 and 8 and thus, the rotation of the take-up reel 5 in the draw-out direction is locked. In this manner, there is effected a condition in which the webbing W safely and comfortably fits to the wearer.

When the wearer then puts off the webbing, the take-up reel 5 is caused to turn counter-clockwise by the take-up spring because the rotation of the take-up reel 5 in the take-up direction is always permitted, and thus the take-up reel 5 takes up the webbing W. As this goes on, the cam member 15 remains in its position of FIG. 5, while the arm member 11 is caused to move to the right by the groove 10a in the sensing member 10 and again brings the lock member 14 into its non-locking position, whereby the position of FIG. 4 is restored.

As described above, according to the present invention, the sensing member senses the rotational condition of the take-up reel and moves the first movable member, which is the arm member, and controls the lock member and therefore, the lock member can be stable and reliable controlled without being afected as by the rolled-up condition of the webbing, and there is also provided the second movable member, which is the cam member, and this makes clear the boundary between the locking position and the non-locking position of the lock member and further, the sensing member is not of the type which contacts the webbing to sense the winding-amount thereof, and this eliminates any trouble such as unsatisfactory draw-out of the webbing.

I claim:

1. An automatic locking type take-up device comprising:
   a base member;
   a webbing take-up reel rotatably supported by said base member and biased in a direction to take-up webbing;
   engaging means mounted on said take-up reel for engagement with a lock member to prevent rotation of said take-up reel in a webbing draw-out direction but to permit rotation of said take-up reel in the webbing take-up direction;
   a webbing winding-amount sensing member rotatable in response to rotation of said take-up reel;
   a lock member movably supported by said base member and capable of assuming a locking position in which it is engaged with said engaging means and a non-locking position in which it is not engaged with said engaging means;
   a biasing member biasing said locking member toward said locking position;
   a first movable member having means engaged with said winding-amount sensing member for causing said first movable member to be moved in a first direction, when said take-up reel rotates in the webbing take-up direction, toward a position in which said first movable member engages said lock member to hold the same in said non-locking position, and for causing said first movable member to be moved in a second direction, when said take-up reel rotates in the webbing draw-out direction, toward a position in which said first movable member is disengaged from said lock member; and
   a second movable member having means frictionally engaging said first movable member for causing said second movable member to be moved, when said first movable member moves in said first direction, toward a position in which said second movable member is out of engagement with said lock member, and for causing said second movable member to be moved, when said first movable member moves in said second direction, toward a position in which said second movable member engages said lock member to hold the same in said non-locking position;
   whereby when the webbing is substantially fully taken-up by said reel, said lock member is held in said non-locking position by said first member so that the webbing may be drawn out from said reel and later, during draw-out of the webbing, said lock member is held in said non-locking position by said second member, and thereafter, when a small amount of webbing is taken up by said reel, said lock member is disengaged from both said first and second movable members and moved to said locking position by said biasing member so as to prevent the rotation of said take-up reel in the webbing draw-out direction.

2. A take-up device according to claim 1, wherein said engaging means is a pair of ratchet wheels fixed to opposite ends of said reel and said engagement portion is formed on peripheries of the ratchet wheels.

3. A take-up device according to claim 1, wherein said sensing member is fixed to said reel to rotate integrally therewith.

4. A take-up device according to claim 1, wherein a spiral groove is formed on said sensing member and said first movable member has a protrusion which fits in the spiral groove.

5. A take-up device according to claim 1, wherein a groove is formed in said first movable member and said second movable member is rotatably supported to fit in the groove of said first movable member at the periphery of said second movable member.

* * * * *